UNITED STATES PATENT OFFICE.

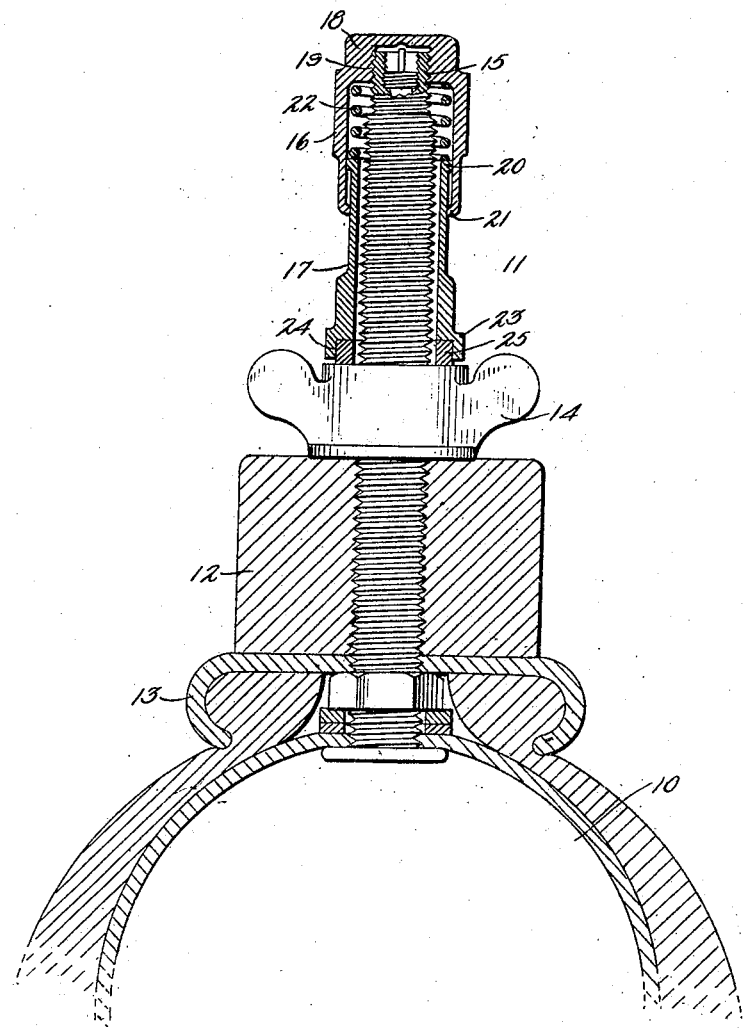

GEORGE B. MULLEN, OF BAY SIDE, NEW YORK.

DUST-CAP FOR TIRE-VALVES.

1,353,061.  Specification of Letters Patent.  Patented Sept. 14, 1920.

Application filed January 29, 1920. Serial No. 354,842.

*To all whom it may concern:*

Be it known that I, GEORGE B. MULLEN, a citizen of the United States, and resident of Bay Side, Flushing, in the borough of Queens, county of Queens and State of New York, have invented a new and Improved Dust-Cap for Tire-Valves, of which the following is a full, clear, and exact description.

This invention relates to pneumatic tire valves and particularly to an improvement in dust caps for the same. In valves now in general use, the stem is provided with a cap adapted to close its outer end, a second cap being employed to cover the first cap and close the portion of the valve stem projecting from the inner periphery of the felly. This requires two separate operations to gain access to the tire valve, in that both caps must be independently removed from the stem.

It is therefore one of the principal objects of the present invention to provide in combination a closure for the valve stem and a dust cap in order to overcome the above recited objections.

One of the main difficulties presented in combining a closure and a dust cap has been due to the variation in the thickness of the felly.

A second object of the invention therefore, is to provide a combination valve stem closure, and dust cap in which the dust cap is provided with means to compensate for varying thicknesses of fellies.

A further object of the invention is to provide a dust cap for a tire valve which reduces the time and labor required for the inflation of the tire to a minimum by obviating the necessity of separately removing the dust cap and the valve stem cap.

With these and other objects in view which will be more readily apparent from the following description and claims, reference is made to the accompanying drawings forming a part of this application and in which:

The figure is a vertical sectional view through a portion of a tire and felly and through the improved closure and dust cap.

Referring to the drawings by characters of reference, 10 designates a portion of a tire provided with a valve stem 11 and 12 the felly which carries the rim 13. The usual winged nut 14 is provided and adapted to be threadedly engaged with the valve stem to secure the same in place, said nut being disposed at the inner side of the felly. The inner free extremity of the valve stem is reduced and threaded as at 15 for the reception of the usual form of valve cap, which is discarded when use is made of the improved form of valve closure and dust cap.

The invention includes a pair of cylindrical telescopic sections 16 and 17, the former having a closed head 18 provided with a central threaded recess 19 adapted to engage the reduced threaded extremity 15 of the valve stem. The section 17 is provided with an annular flange 20 and the section 16 is upset to provide an annular flange 21 in order to provide coacting means to limit the separation of said sections. A coiled expansion spring 22 is arranged within the section 16, one extremity thereof bearing against the inner face of the head 18 and the opposite extremity against the annular flange 20 in order to provide means for effecting relative separation of said sections. The outer free extremity of the section 17 is enlarged as at 23 and is provided with a recess 24 for the reception of a gasket 25.

In use of the device, the section 17 is applied to the portion of the valve stem projecting from the winged nut and the section 16 carried thereby depressed against the action of the spring 22 until the threaded recess 19 engages the threaded extremity 15 of the valve stem. The section 16 is then manipulated to thread the recess upon the extremity 15 to close the outer extremity of the valve stem. The expansion spring 16 serves to advance the gasket 25 against the wing nut to seal the free end of the section 17 for excluding the possible entrance of dust, dirt or foreign matter to the valve stem. It will be seen that in applying or removing the device it is only necessary to manipulate the section 16 in the proper direction thus obviating the two operations of removing the dust cap and then the valve cap.

While a single and preferred embodiment of the invention has been shown, it is understood that the same is merely illustrative of one method of reducing the invention to practice and modifications and changes falling within the scope of the claims may be resorted to when found expedient.

Having thus described my invention, what I claim as new and desire to secure by Letters Patent, is—

1. A device of the character described comprising an open ended cap having a central threaded recess in the closed end adapted to engage with and close the extremity of a valve stem, a cylindrical member telescopically received by said cap, means for effecting relative separation of the cap and said member, and means for limiting relative separation thereof.

2. The combination with a cap or closure for tire valve stems of a sleeve telescopically received by said cap, means for projecting the sleeve therefrom and means for limiting relative separation thereof.

3. A dust cap for tire valve stems comprising relatively separable telescopic inner and outer sections, the outer section having a closed end provided with a central threaded recess adapted to engage the outer threaded extremity of the valve stem to constitute a closure therefor, an inwardly projecting annular flange at the open end of said section, an outwardly disposed annular flange provided on the inner section, and a coiled expansion spring disposed between the inner end of the inner section and the closed end of the outer section for normally effecting relative separation of said sections, the said flanges constituting means for limiting the relative separation of said section.

4. The combination with a valve stem, of a closure therefor comprising a cap having communicating concentric bores, one of said bores being reduced and threaded to engage the open end of the valve stem for closing the same against the entrance of dust, a sleeve telescopically received by the other bore having a portion thereof extending therefrom, means for effecting normal relative separation of the sleeve and cap, and means for limiting the relative separation thereof.

GEORGE B. MULLEN.